United States Patent
Nishio

(10) Patent No.: US 11,243,730 B2
(45) Date of Patent: Feb. 8, 2022

(54) INFORMATION PROCESSING APPARATUS, METHOD AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Taku Nishio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

(21) Appl. No.: 16/194,406

(22) Filed: Nov. 19, 2018

(65) Prior Publication Data
US 2019/0163423 A1 May 30, 2019

(30) Foreign Application Priority Data
Nov. 27, 2017 (JP) .............................. JP2017-226497

(51) Int. Cl.
*G06F 3/12* (2006.01)
(52) U.S. Cl.
CPC .......... *G06F 3/1262* (2013.01); *G06F 3/1208* (2013.01); *G06F 3/1259* (2013.01)
(58) Field of Classification Search
CPC .... G06F 3/1262; G06F 3/1208; G06F 3/1259; G06F 3/1211; G06F 3/1237; G06F 3/12; G06F 3/1267; G06F 3/1285
See application file for complete search history.

(56) References Cited

U.S. PATENT DOCUMENTS

| | | | |
|---|---|---|---|
| 6,507,411 B1 * | 1/2003 | Nishikawa | H04N 1/393 358/1.2 |
| 8,115,940 B2 | 2/2012 | Utsunomiya et al. | |
| 8,363,239 B2 | 1/2013 | Utsunomiya et al. | |
| 9,772,804 B2 | 9/2017 | Ito | |
| 2006/0139690 A1 * | 6/2006 | Yagita | G06F 3/1286 358/1.15 |
| 2011/0051171 A1 * | 3/2011 | Lee | G06F 3/1207 358/1.14 |
| 2013/0003118 A1 | 1/2013 | Ito | |
| 2014/0268216 A1 * | 9/2014 | Soriano | G06F 3/1263 358/1.15 |

(Continued)

FOREIGN PATENT DOCUMENTS

| | | |
|---|---|---|
| JP | 2001134394 | 5/2001 |
| JP | 2003260847 | 9/2003 |
| JP | 2005174122 | 6/2005 |

(Continued)

OTHER PUBLICATIONS

Office Action of Japan Counterpart Application, with English translation thereof, dated Jun. 15, 2021, pp. 1-8.

(Continued)

*Primary Examiner* — Iriana Cruz
(74) *Attorney, Agent, or Firm* — JCIPRNET

(57) ABSTRACT

An information processing apparatus includes a reception unit that receives an operation for a group printing job including plural printing jobs, and an instructing unit that gives an instruction to an image forming apparatus performing printing processing based on the printing job, in accordance with the operation.

15 Claims, 17 Drawing Sheets

| PRINTING JOB OPERATION (1205) | ORDER OF EXECUTION IN PRINTING JOB GROUP (1210) | TARGET STATUS (1215) |
|---|---|---|
| RESTART OF PRINTING | FORWARD ORDER | PRINTING HOLDING |
| PAUSE | REVERSE ORDER | PRINTING |
| CANCELLATION | REVERSE ORDER | PRINTING HOLDING, PRINTING |
| TRIAL PRINTING | FORWARD ORDER | PRINTING HOLDING |
| PREFERENTIAL PRINTING | FORWARD ORDER | PRINTING HOLDING |
| INTERRUPTION PRINTING | REVERSE ORDER | PRINTING HOLDING |

1200

(56) References Cited

U.S. PATENT DOCUMENTS

2015/0153985 A1* 6/2015 Fujinaga ............... G06F 3/1203
358/1.15
2019/0073164 A1* 3/2019 Yamasaki ............. G06F 3/1234

FOREIGN PATENT DOCUMENTS

| JP | 2005174225 | 6/2005 |
| JP | 2006004077 | 1/2006 |
| JP | 2007216477 | 8/2007 |
| JP | 2013014021 | 1/2013 |
| JP | 2013156918 | 8/2013 |
| JP | 2016162235 | 9/2016 |

OTHER PUBLICATIONS

"Office Action of Japan Counterpart Application" with English translation thereof, dated Nov. 16, 2021, p. 1-p. 8.

* cited by examiner

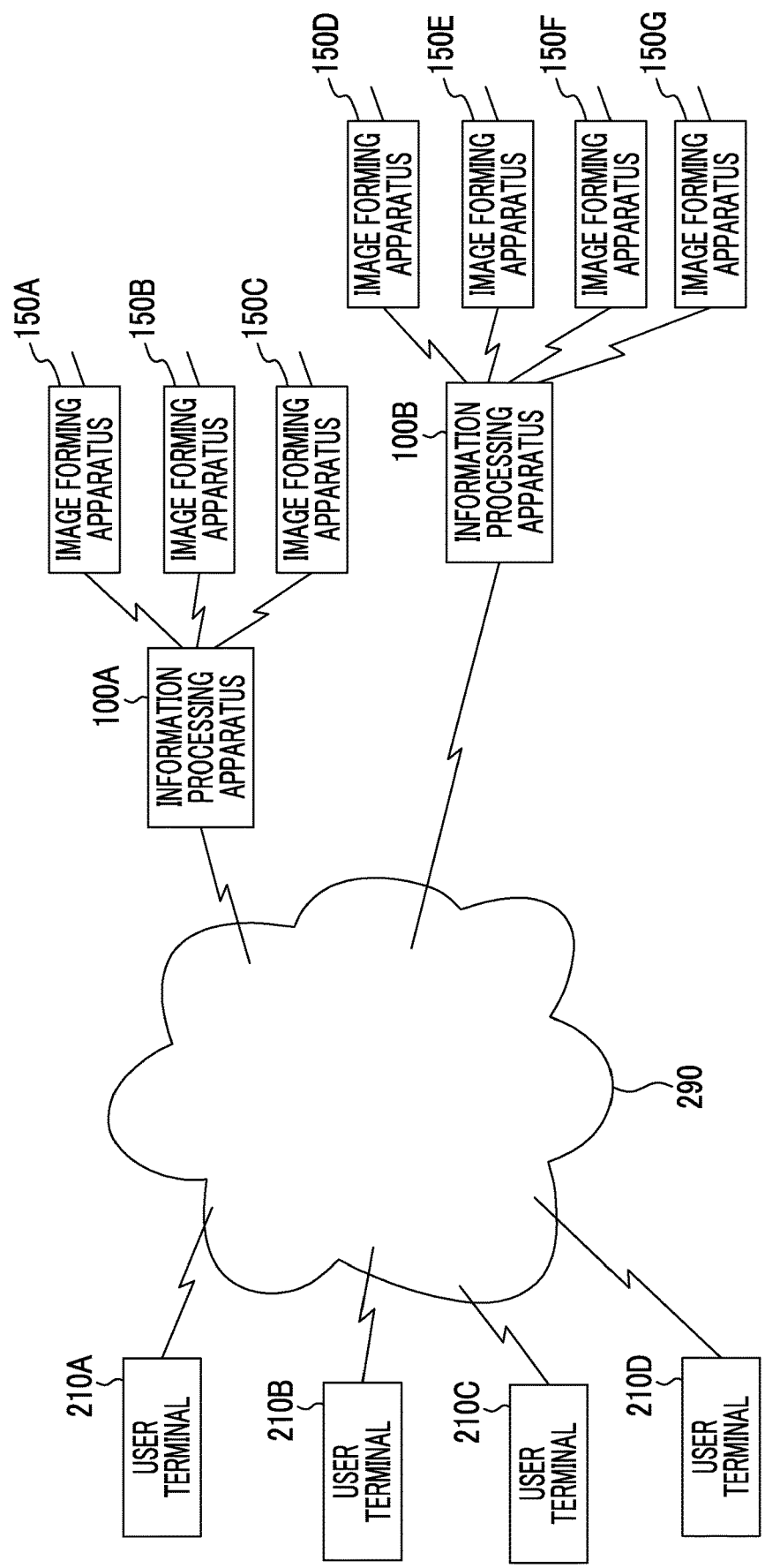

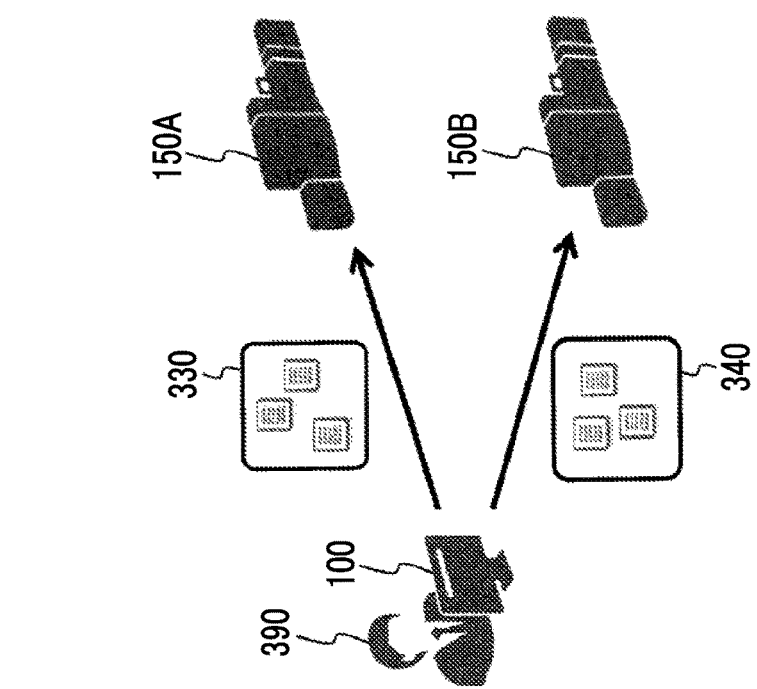
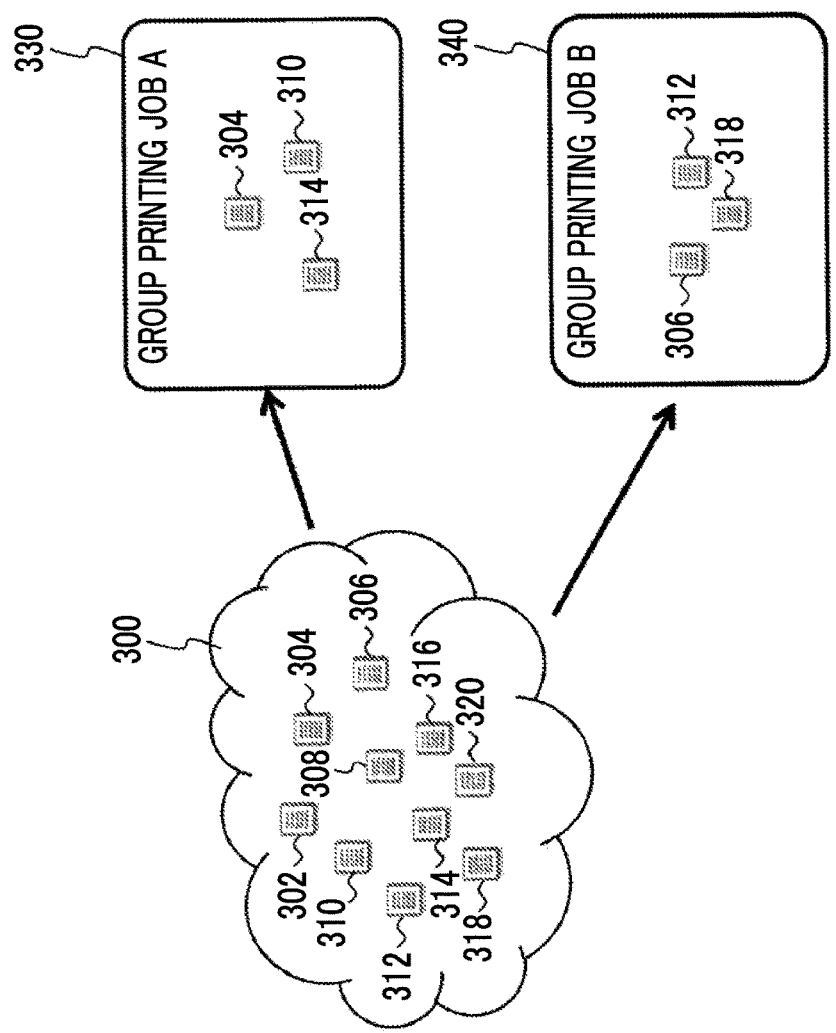

FIG. 6

| PRINTING JOB ID 605 | GROUP FLAG 610 | GROUP PRINTING JOB NAME 615 | NUMBER OF PRINTING JOBS 620 | PRINTING JOB ID 625 | HIGHEST PRIORITY PRINTING JOB ID 630 |
|---|---|---|---|---|---|
| 9 | 1 | GROUP JOB A | 5 | 1, 10, 15, 16, 20 | 15 |

| 705 | 710 | 715 | 720 | 725A | 730A |
|---|---|---|---|---|---|
| PRINTING JOB ID | GROUP FLAG | GROUP PRINTING JOB NAME | NUMBER OF PRINTING JOBS | PRINTING JOB ID | ORDER |
| 9 | 1 | GROUP JOB A | 5 | 1 | 3 |

700

| 725B | 730B | 725C | 730C | 725D | 730D | 725E | 730E |
|---|---|---|---|---|---|---|---|
| PRINTING JOB ID | ORDER | PRINTING JOB ID | ORDER | PRINTING JOB ID | ORDER | PRINTING JOB ID | ORDER |
| 10 | 2 | 15 | 1 | 16 | 5 | 20 | 4 |

FIG. 8

| 805 | 810 | 815 | 820 | 825 | 830 |
|---|---|---|---|---|---|
| PRINTING JOB ID | GROUP FLAG | PRINTING JOB NAME | OWNER | NUMBER OF PAGES | NUMBER OF COPIES |
| 1 | 0 | PAMPHLET00-1 | USER A | 16 | 50 |

| 835 | 840 | 845 | 850 | 855 | 860 |
|---|---|---|---|---|---|
| SHEET SIZE | SHEET TYPE | PRINTING DOCUMENT | COLOR/BLACK AND WHITE | DESIGNATED DATE AND TIME | POST-PROCESSING |
| A4 | | DOCUMENT ID | COLOR | | |

| 905 | 910 | 915 | 920 | 925 |
|---|---|---|---|---|
| PRINTING APPARATUS ID | PRINTING APPARATUS NAME | PRINTING SPEED | MOUNTABLE TONER TYPE | MOUNTABLE SHEET |
| | | | | |

| 930 | 935 | 940 | 945 | 950 |
|---|---|---|---|---|
| TWO-SIDED PRINTING | MAXIMUM SHEET FEED CAPACITY | NUMBER OF DISCHARGING DESTINATIONS | POST-PROCESSING FUNCTION | PRINTING COST |
| | | | | |

| PRINTING APPARATUS ID | PRINTING JOB ID | PRINTING APPARATUS SIDE PRINTING JOB ID |
|---|---|---|
| | | |

| 1105 | 1110 | 1115 | 1120 | 1125 |
|---|---|---|---|---|
| PRINTING APPARATUS ID | PRINTING APPARATUS NAME | PRINTING APPARATUS SIDE PRINTING JOB ID | CONDITION | PREDICTED PRINTABLE DATE AND TIME |
|  |  |  |  |  |

1100

| REMAINING TONER QUANTITY | | | | REMAINING SHEET QUANTITY | | |
|---|---|---|---|---|---|---|
| A TONER | B TONER | C TONER | ... | A4 | A3 | ... |
|  |  |  |  |  |  |  |

| PRINTING JOB OPERATION | ORDER OF EXECUTION IN PRINTING JOB GROUP | TARGET STATUS |
|---|---|---|
| RESTART OF PRINTING | FORWARD ORDER | PRINTING HOLDING |
| PAUSE | REVERSE ORDER | PRINTING |
| CANCELLATION | REVERSE ORDER | PRINTING HOLDING, PRINTING |
| TRIAL PRINTING | FORWARD ORDER | PRINTING HOLDING |
| PREFERENTIAL PRINTING | FORWARD ORDER | PRINTING HOLDING |
| INTERRUPTION PRINTING | REVERSE ORDER | PRINTING HOLDING |

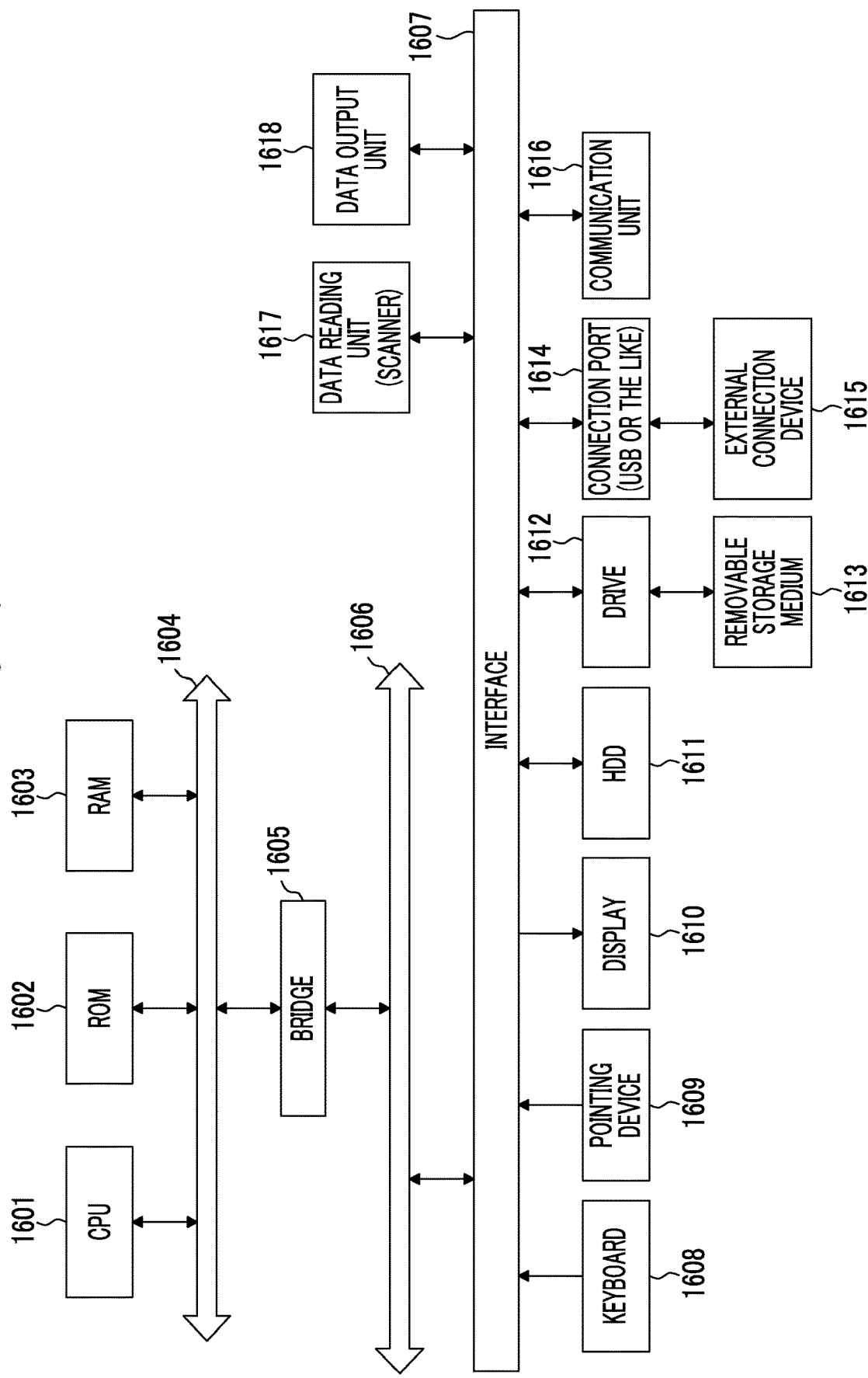

INFORMATION PROCESSING APPARATUS, METHOD AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-226497 filed Nov. 27, 2017.

BACKGROUND

Technical Field

The present invention relates to an information processing apparatus and a non-transitory computer readable medium storing an information processing program.

SUMMARY

According to an aspect of the invention, there is provided an information processing apparatus including a reception unit that receives an operation for a group printing job including plural printing jobs, and an instructing unit that gives an instruction to an image forming apparatus performing printing processing based on the printing job, in accordance with the operation.

BRIEF DESCRIPTION OF THE DRAWINGS

Exemplary embodiment(s) of the present invention will be described in detail based on the following figures, wherein:

FIGS. 2A and 2B are diagrams illustrating a system configuration example using this exemplary embodiment;

FIGS. 3A and 3B are diagrams illustrating a use example of this exemplary embodiment;

FIG. 6 is a diagram illustrating an example of a data structure of a group printing job table;

FIG. 7 is a diagram illustrating an example of a data structure of a group printing job table;

FIG. 8 is a diagram illustrating an example of a data structure of a printing job table;

FIG. 9 is a diagram illustrating an example of a data structure of a printing apparatus table;

FIG. 10 is a diagram illustrating an example of a data structure of a printing job correspondence table;

FIG. 11 is a diagram illustrating an example of a data structure of a printing apparatus condition table;

FIG. 12 is a diagram illustrating an example of a data structure of an operation method table;

FIG. 16 is a block diagram illustrating a hardware configuration example of a computer for realizing this exemplary embodiment.

DETAILED DESCRIPTION

Hereinafter, an example of an exemplary embodiment in realizing the invention will be described with reference to the accompanying drawings.

Figure 1:
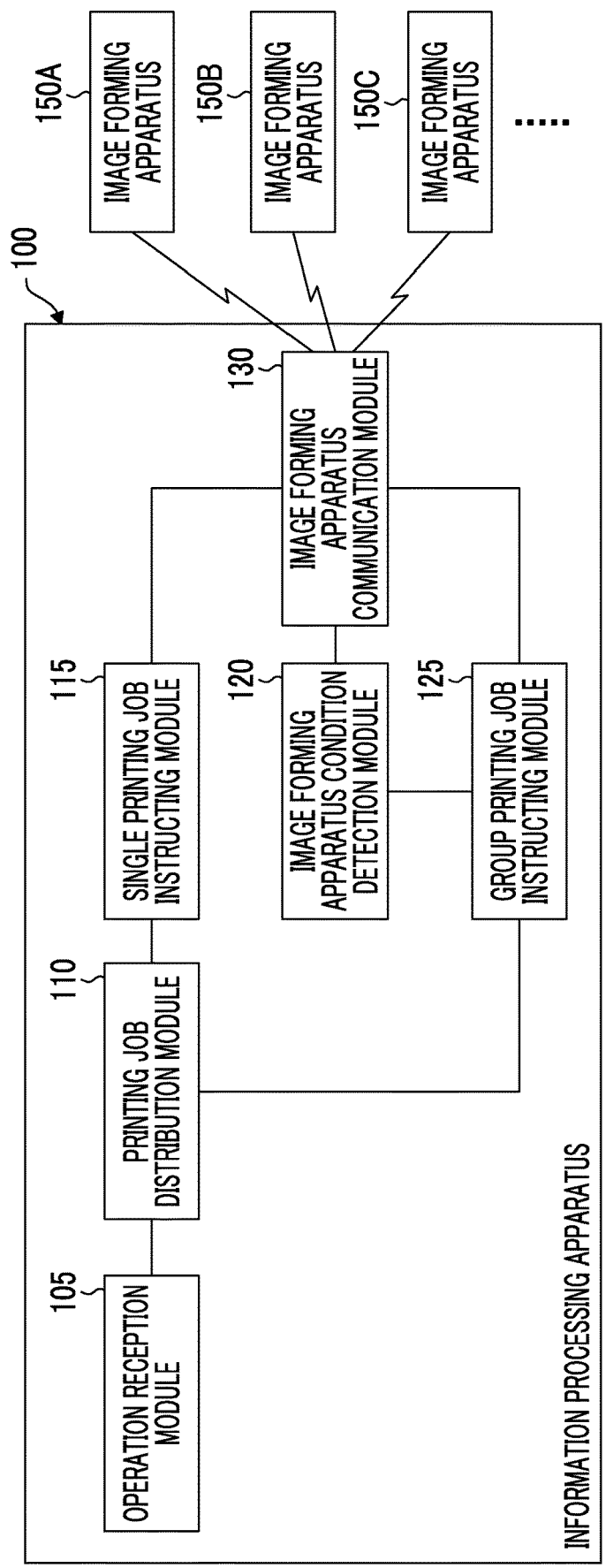
FIG. 1 is a conceptual module configuration diagram illustrating a configuration example according to this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 according to this exemplary embodiment receives a printing job to select an image forming apparatus 150 (hereinafter, also referred to as a printing apparatus) which is suitable for the printing job, and transmits the printing job to the image forming apparatus 150. As illustrated in the example of FIG. 1, the information processing apparatus includes an operation reception module 105, a printing job distribution module 110, a single printing job instructing module 115, an image forming apparatus condition detection module 120, a group printing job instructing module 125, and an image forming apparatus communication module 130. The image forming apparatus 150 performs printing processing in accordance with the printing job.

An example of the image forming apparatus 150 is a production printer. The production printer performs light printing for an intra-office printing department of a company, and a print shop, and the like. In general, the image forming apparatus is in charge of a large quantity of printing. Meanwhile, the image forming apparatus is not limited to the production printer, and may be applied to general printers (printers for business, printers for home, and the like).

Here, the image forming apparatus 150 may not perform processing of an operation on a group printing job constituted by plural printing jobs, and may perform processing on a single printing job. That is, the image forming apparatus 150 may not perform processing of an operation on the group printing job, and thus the information processing apparatus 100 needs to perform conversion into the printing jobs constituting the group printing job in a case of receiving an operation on the group printing job. Specifically, examples of the operation mentioned here include the restart of printing (a concept including the start of printing), pause, cancellation, trial printing, preferential printing, interruption printing, and the like. Meanwhile, the trial printing refers to printing corresponding to one copy (or the first page) even in a case where the setting (properties) of a printing job is plural copies. In addition, the preferential printing refers to printing which is performed preferentially rather than being performed in order of printing which is determined in advance. Specifically, the preferential printing means that printing processing of a printing job, which is set to be in a preferential printing mode, is immediately started in a case where there is no printing job set to be in a printing mode, and means that printing processing of a printing job, which is set to be in a preferential printing mode, is immediately started after printing of the printing job is terminated in a case where there is a printing job set to be in a printing mode.

Meanwhile, regarding the printing processing itself, the information processing apparatus 100 performs control of transmitting the printing jobs in the group printing job to the image forming apparatus 150 in accordance with the order of printing of the group printing job. In the image forming apparatus 150, it is possible to cope with the group printing job by a combination of the information processing apparatus 100 and the image forming apparatus 150 in a case where the printing processing of the printing jobs is performed in order of transmission.

A group printing job which is a set of printing jobs is created in accordance with a management method for a user's printing job. For example, the following operation may be performed by the group printing job.

(1) Printing jobs related to a customer's order may be treated as a set.

(2) Printing jobs accumulated in the information processing apparatus 100 having a function as a spooler may be collectively treated in units in which operation may be effectively performed as follows according to a printing process operator's situation.

(a) Printing jobs are collected for each output sheet.

(b) Printing jobs having the same required post-processing are collected.

(c) Printing jobs are collected for each operator in charge.

(d) Printing jobs are collected in accordance with an operation date and an operation time.

As a configuration in which printing jobs are effectively performed by using plural printers, a configuration in which a user's work is simplified by presenting a preferential printer to the printing job is provided. This exemplary embodiment achieves simplification and standardization of the user's work and provides a merit a reduction in load in a printing process by providing the same function to a group printing job serving as a set in addition to a single printing job.

The operation reception module 105 is connected to the printing job distribution module 110. The operation reception module 105 receives an operation on a printing job or a group printing job constituted by plural printing jobs. Naturally, only an operation for the group printing job may be received.

The printing job distribution module 110 is connected to the operation reception module 105, the single printing job instructing module 115, and the group printing job instructing module 125. The printing job distribution module 110 determines whether an operation received by the operation reception module 105 is an operation for a single printing job or an operation for a group printing job. The printing job distribution module transmits the operation for the printing job to the single printing job instructing module 115 in a case where the operation is an operation for a single printing job, and transmits the operation for the printing job to the group printing job instructing module 125 in a case where the operation is an operation for a group printing job. For example, the printing job distribution module may perform the determination by using an indicator indicating whether being a group printing job included in the printing jobs which are targets for the operation received by the operation reception module 105, and may perform the determination in accordance with whether the printing jobs which are targets for the operation include plural printing jobs.

The single printing job instructing module 115 is connected to the printing job distribution module 110 and the image forming apparatus communication module 130. The single printing job instructing module 115 transmits the operation for the printing job which is transmitted from the printing job distribution module 110 to the image forming apparatus 150 transmitting the printing job through the image forming apparatus communication module 130 in accordance with the operation. For example, in a case where a printing restart operation is received for the printing job, an instruction for restarting printing of the printing job set to be in a printing holding mode (printing waiting mode) is transmitted to the image forming apparatus 150 to which the printing job is transmitted.

The image forming apparatus condition detection module 120 is connected to the group printing job instructing module 125 and the image forming apparatus communication module 130. The image forming apparatus condition detection module 120 receives conditions of the image forming apparatus 150 from each of the image forming apparatuses 150 through the image forming apparatus communication module 130. The conditions are transmitted to the group printing job instructing module 125.

The group printing job instructing module 125 is connected to the printing job distribution module 110, the image forming apparatus condition detection module 120, and the image forming apparatus communication module 130. The group printing job instructing module 125 gives an instruction to the image forming apparatus 150 currently performing printing processing based on the printing job which is a target for the operation, in accordance with operation received by the operation reception module 105. This exemplary embodiment controls a group printing job more finely and improves transmission efficiency through communication of printing instruction information having a data size of approximately several hundreds of bytes to approximately several kilobytes.

Specifically, the group printing job instructing module 125 transmits the instruction to the image forming apparatus 150 through the image forming apparatus communication module 130. Meanwhile, the "image forming apparatus 150 currently performing printing processing" includes the image forming apparatus 150 set to be in a printing holding mode. That is, the printing processing itself is not required to be performed at the point in time. Naturally, the printing processing itself may need to be performed at the point in time.

In addition, the group printing job instructing module 125 may receive the conditions of the image forming apparatus 150 from the image forming apparatus condition detection module 120 to give an instruction to the image forming apparatus 150 in accordance with the conditions. For example, the conditions of the image forming apparatus 150 include a condition indicating whether or not there is a printing job set to be in a printing holding mode, a condition indicating whether or not there is a printing job set to be in a printing mode, a condition indicating whether or not there is a printing job set to be in a printing holding mode or a printing mode, and the like.

For example, in a case where the group printing job instructing module 125 receives restart of printing as the operation for the group printing job, the group printing job instructing module may give an instruction for restarting printing to the image forming apparatus 150 corresponding to a printing job set to be in a printing holding mode in the group printing job.

Further, the group printing job instructing module 125 may give an instruction for restarting printing to the image forming apparatus 150 in accordance with the order in the group printing job, among printing jobs set to be in a printing holding mode. Here, the "order in the group printing job" is so-called forward order, the printing jobs in the group printing job have order, and processing is performed in the order.

For example, in a case where the group printing job instructing module 125 receives pause as the operation for the group printing job, the group printing job instructing module gives an instruction for the pause to the image forming apparatus 150 corresponding to a printing job set to be in a printing mode in the group printing job.

Further, the group printing job instructing module 125 may give an instruction for the pause to the image forming apparatus 150 in reverse order to the order in the group printing job, among printing jobs set to be in a printing mode.

For example, in a case where the group printing job instructing module 125 receives cancellation as the operation for the group printing job, the group printing job instructing module gives an instruction for the cancellation to the image forming apparatus 150 corresponding to a printing job set to be in a printing holding mode or a printing mode in the group printing job.

Further, the group printing job instructing module 125 may give an instruction for the cancellation to the image forming apparatus 150 in reverse order to the order in the group printing job, among printing jobs set to be in a printing holding mode or a printing mode.

For example, in a case where the group printing job instructing module 125 receives trial printing as the operation for the group printing job, the group printing job instructing module may give an instruction for the trial printing to the image forming apparatus 150 corresponding to a printing job set to be in a printing holding mode in the group printing job.

Further, the group printing job instructing module 125 may give an instruction for the trial printing to the image forming apparatus 150 in the order in the group printing job, among printing jobs set to be in a printing holding mode.

For example, in a case where the group printing job instructing module 125 receives preferential printing as the operation for the group printing job, the group printing job instructing module may give an instruction for the preferential printing to the image forming apparatus 150 corresponding to a printing job set to be in a printing holding mode in the group printing job.

Further, the group printing job instructing module 125 may give an instruction for the preferential printing to the image forming apparatus 150 in the order in the group printing job, among printing jobs set to be in a printing holding mode.

For example, in a case where the group printing job instructing module 125 receives interruption printing as the operation for the group printing job, the group printing job instructing module may give an instruction for the interruption printing to the image forming apparatus 150 corresponding to a printing job set to be in a printing holding mode in the group printing job.

Further, the group printing job instructing module 125 may give an instruction for the interruption printing to the image forming apparatus 150 in reverse order to the order in the group printing job, among printing jobs set to be in a printing holding mode.

The image forming apparatus communication module 130 is connected to the single printing job instructing module 115, the image forming apparatus condition detection module 120, the group printing job instructing module 125, an image forming apparatus 150A, an image forming apparatus 150B, and an image forming apparatus 150C. The image forming apparatus communication module 130 transmits an instruction for a printing job or a group printing job to the image forming apparatus 150 selected by the single printing job instructing module 115 or the group printing job instructing module 125. Detection results of the conditions of each of the image forming apparatuses 150 are received from the image forming apparatus 150, and are transmitted to the group printing job instructing module 125.

The image forming apparatuses 150 (image forming apparatus 150A, the image forming apparatus 150B, and the image forming apparatus 150C) are connected to the image forming apparatus communication module 130 of the information processing apparatus 100. The image forming apparatus 150 receives the printing job or the group printing job transmitted from the information processing apparatus 100 and performs printing processing in accordance with the printing job. Processing based on an instruction for the printing job (including a printing job included in the group printing job) is performed.

Meanwhile, in the example of FIG. 1, three image forming apparatuses 150 are connected, but one or more image forming apparatuses 150 may be connected.

Figure 2A:
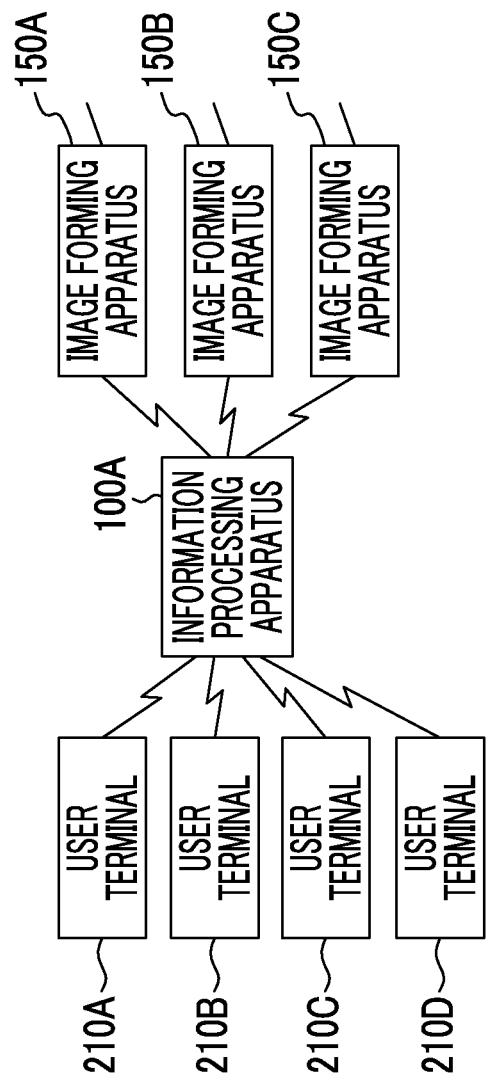

FIGS. 2A and 2B are diagrams illustrating a system configuration example using this exemplary embodiment.

Meanwhile, the information processing apparatus 100 may be included in an external controller of the image forming apparatus 150.

In the example illustrated in FIG. 2A, an information processing apparatus 100A is connected to user terminals 210 (a user terminal 210A, a user terminal 210B, a user terminal 210C, and a user terminal 210D), the image forming apparatuses 150 (the image forming apparatus 150A, the image forming apparatus 150B, and the image forming apparatus 150C).

The information processing apparatus 100A receives a printing job or a group printing job from the user terminal 210 and transmits the printing job or the group printing job to the image forming apparatus 150 suitable for the printing job or the group printing job. The image forming apparatus 150 performs printing processing in accordance with the received printing job or group printing job. The information processing apparatus 100A receives a user's operation for the printing job or the group printing job and gives an instruction based on the operation to the image forming apparatus 150 performing the printing job or the group printing job. Meanwhile, the user's operation is performed on the information processing apparatus 100A or the user terminal 210.

In the example illustrated in FIG. 2B, the information processing apparatus 100A, the information processing apparatus 100B, the user terminal 210A, the user terminal 210B, the user terminal 210C, and the user terminal 210D are connected to each other through a communication line 290. The communication line 290 may be a wireless line, a wired line, or a combination thereof, and may be, for example, the Internet, an intranet, or the like as communication infrastructure. In addition, the functions of the information processing apparatus 100 may be realized as cloud service.

The information processing apparatus 100A is connected to the image forming apparatus 150A, the image forming apparatus 150B, and the image forming apparatus 150C.

The information processing apparatus 100B is connected to an image forming apparatus 150D, an image forming apparatus 150E, an image forming apparatus 150F, and an image forming apparatus 150G.

The information processing apparatus 100 receives a printing job or a group printing job from the user terminal 210 through the communication line 290 and transmits the printing job or the group printing job to the image forming apparatus 150 suitable for the printing job or the group printing job. The image forming apparatus 150 performs printing processing in accordance with the received printing job or group printing job. The information processing apparatus 100A or the information processing apparatus 100B receives the user's operation for the printing job or the group printing job, and gives an instruction based on the operation to the image forming apparatus 150 processing the printing job or the group printing job. Meanwhile, the user's operation is performed on the information processing apparatus 100A, the information processing apparatus 100B, or the user terminal 210.

FIGS. 3A and 3B are diagrams illustrating a use example of this exemplary embodiment. A group printing job will be described in more detail.

The group printing job is constituted by plural printing jobs. That is, the group printing job is a unit of the collecting of some printing jobs, and is like a box including plural printing jobs. Therefore, the group printing job itself does not have printing data and printing setting, and the printing jobs as constituent elements individually have printing data and printing setting.

For example, some printing jobs are collected into any bundle advantageous to the user, such as the same sheet used in printing, and collective operations of the printing jobs are realized with respect to a group printing job which is a set of printing jobs. That is, the group printing job may be treated as just one printing job.

In addition, totalized information (for example, the number of printed sheets, and the like) of the printing jobs included in the group printing job is one of determination materials during the distribution of the printing jobs to the plural image forming apparatuses 150.

A printing job group 300 includes a printing job 302, a printing job 304, a printing job 306, a printing job 308, a printing job 310, a printing job 312, a printing job 314, a printing job 316, a printing job 318, a printing job 320, and the like. Among these, the printing jobs may be collected as described above. For example, it is possible to create a group printing job A 330 including the printing job 304, the printing job 310, and the printing job 314. In addition, it is possible to create a group printing job B 340 including the printing job 306, the printing job 312, and the printing job 318.

The information processing apparatus 100 may cause each of the image forming apparatuses 150 to perform processing such as the transmission of the printing job, pause, trial printing, restart of printing, and cancellation by an operation of a user 390.

In the group printing job A 330, in a case where any sheet A is set as a printing sheet, the image forming apparatus 150A having the sheet A set in advance (also referred to as "a stock A is set") is selected, and the group printing job A 330 is transmitted to the image forming apparatus 150A.

Additionally, in the group printing job B 340, in a case where a total number of printed sheets is 3000, the image forming apparatus 150B capable of performing printing without any work in the middle of the output of 3000 sheets (without removing the printed sheets from a discharged sheet reception unit in the middle of printing) is selected, and the group printing job B 340 is transmitted to the image forming apparatus 150B. In this case, the discharged sheet reception unit of the image forming apparatus 150B may receive 3000 sheets or more.

Figure 4:
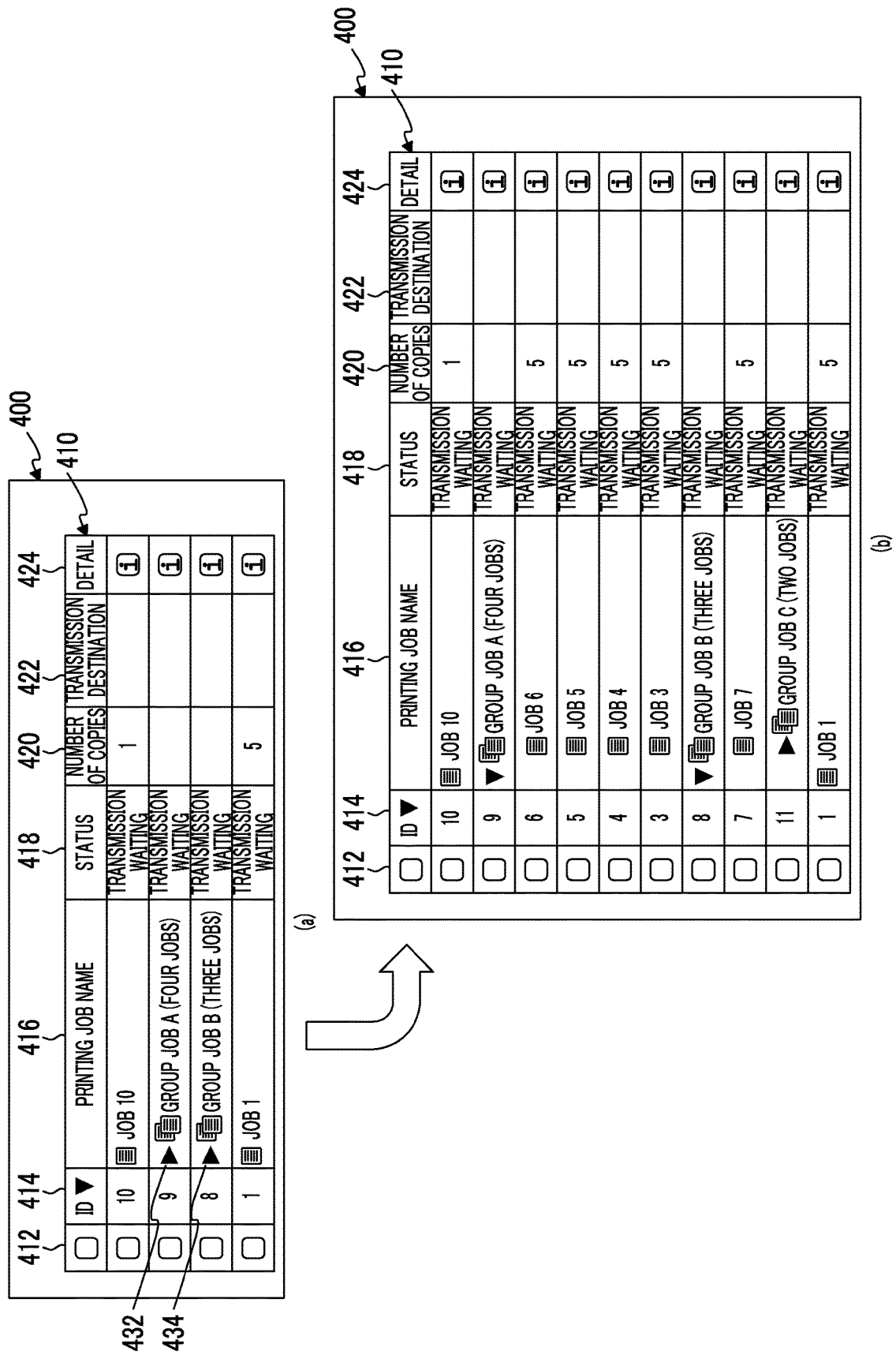
FIG. 4 is a diagram illustrating a display example of a screen according to this exemplary embodiment.

FIG. 4 is a diagram illustrating a display example of a screen 400 according to this exemplary embodiment, and illustrate displays examples of a group printing job and a printing job in the information processing apparatus 100.

In (a) of FIG. 4, a printing job display region 410 is displayed on the screen 400. The printing job display region 410 includes a check column 412, an ID column 414, a printing job name column 416, a status column 418, a number-of-copies column 420, a transmission destination column 422, and a detail column 424. The check column 412 includes a check column to be processed. The above-described operation may be performed on a printing job or a group printing job which is checked in the check column 412. The ID column 414 displays identification information (ID) of the printing job or the group printing job. The printing job name column 416 displays a printing job name of the printing job or the group printing job. The status column 418 displays the current conditions (status) of the printing job or the group printing job. The number-of-copies column 420 displays the number of copies in the printing job or the group printing job. The transmission destination column 422 displays a transmission destination (image forming apparatus 150) of the printing job or the group printing job. The detail column 424 has a button for displaying details of the printing job or the group printing job.

The following operation method for the group printing job is the same as that for the single printing job (printing job in the related art).

Operations (transmission, copying, deletion, holding/cancellation, and the like) for the group printing job except for [editing]

Operations (restart of printing, pause, cancellation, trial printing, preferential printing, interruption printing, and the like) for the group printing job (group printing job which is already transmitted to the image forming apparatus 150) which is to be processed by the image forming apparatus 150

In addition, whether or not each operation is performed and action in the operation change depending on the status (conditions) of printing jobs included in the group printing job.

In the printing job display region 410 illustrated in the example of (a) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 8, printing job name: group job B (three jobs), status: transmission waiting, the-number-of-copies: undecided, and transmission destination: undecided, and a fourth line shows ID: 1, printing job name: job 1, status: transmission waiting, the-number-of-copies: 5, and transmission destination: undecided.

The printing job name columns 416 in the second and third lines are respectively given a group printing job mark 432 and a group printing job mark 434, which indicate group printing jobs. That is, an icon (a black triangular mark in (a) and (b) of FIG. 4) which indicates an opened/closed state of the group printing job is displayed at the head of the printing job name column 416. Switching between open display and close display of a target group printing job is performed by the user's selection operation (click operation) for the group printing job mark 432 and the group printing job mark 434. During initial display, the display is performed in a state where all group printing jobs are closed. Meanwhile, the "closed" refers to the display of printing jobs constituting the group printing job (see (b) of FIG. 4), and the "opened" refers to the display of only the group printing job (as if only one printing job is present).

A state where the group printing job is opened is illustrated in the example of (b) of FIG. 4.

In the printing job display region 410 illustrated in the example of (b) of FIG. 4, a first line shows ID: 10, printing job name: job 10, status: transmission waiting, the-number-of-copies: 1, and transmission destination: undecided, a second line shows ID: 9, printing job name: group job A (four jobs), status: transmission waiting, the-number-of-copies: undecided, and transmission destination: undecided, a third line shows ID: 6, printing job name: job 6, status: transmission waiting, the-number-of-copies: 5, and transmission destination: undecided, a fourth line shows ID: 5, printing job name: job 5, status: transmission waiting, the-number-of-copies: 5, and transmission destination: undecided, a fifth line shows ID: 4, printing job name: job 4, status: transmission waiting, the-number-of-copies: 5, and transmission destination: undecided, a sixth line shows ID: 3, printing job name: job 3, status: transmission waiting, the-number-of-copies: 5, and transmission destination: undecided, a seventh line shows ID: 8, printing job name: group job B (three jobs), status: transmission waiting, the-number-of-copies: undecided, and transmission destination: undecided, an eighth line shows ID: 7, printing job name: job 7, status: transmission waiting, the-number-of-copies: 5, and transmission destination: undecided, a ninth line shows ID: 11, printing job name: group job C (two jobs), status: transmission waiting, the-number-of-copies: undecided, and transmission destination: undecided, and a tenth line shows ID: 1, printing job name: job 1, status: transmission waiting, the-number-of-copies: 5, and transmission destination: undecided. The third line to the sixth line show a printing job group constituting a group printing job A, and the eighth line and the ninth line show a printing job group constituting a group printing job B. Meanwhile, the group printing job may further include a group printing job. The group printing job B includes a group printing job C. Meanwhile, it may be possible to form a group printing job up to a predetermined number of levels (for example, a maximum of three levels, and the like).

Meanwhile, in a case where the sorting of the ID column 414 is performed in the state of (b) of FIG. 4, a sorting target is a root printing job (a printing job which is not positioned under the group printing job, that is, a single printing job and a group printing job). This is because it is not suitable that printing jobs constituting the group printing job are separated from the group printing job and set to be sorting targets.

Additionally, in a case where the detail column 424 is selected by the user's selection operation, properties of printing jobs in the selected line are presented to a property screen (pop-up screen or the like). That is, general results of the properties of the printing jobs included in the group printing job are presented. For example, a logical OR, totalization, and the like of the properties are performed. Specifically, the extraction of properties of each printing job, the extraction of required post-processing functions (for example, stapler, binding, punching, and the like; also referred to as a finisher), the totalization of the number of sheets for each type of sheet, and the like are performed.

Figure 5:
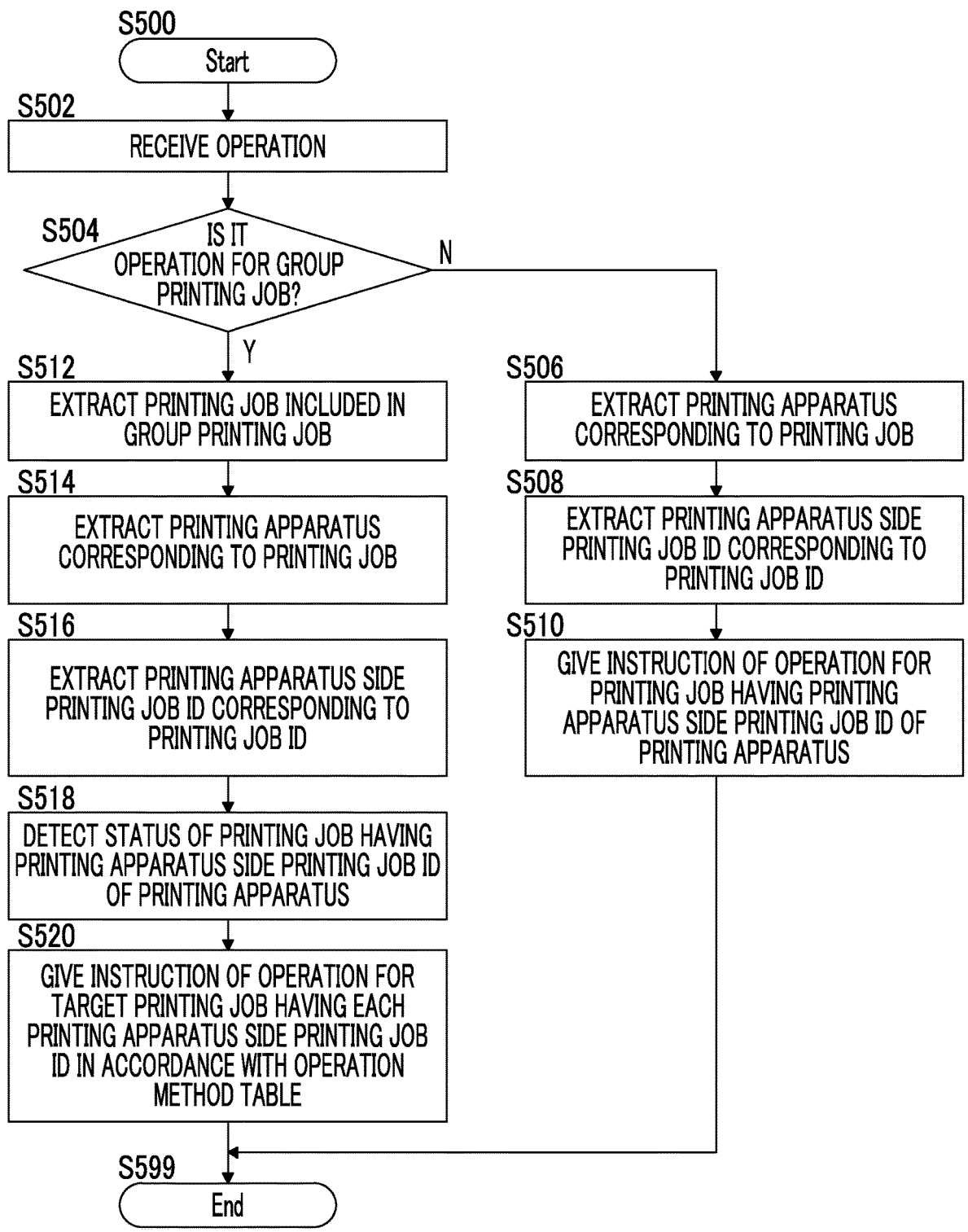
FIG. 5 is a flowchart illustrating a processing example according to this exemplary embodiment.

FIG. 5 is a flowchart illustrating a processing example according to this exemplary embodiment.

In step S502, the operation reception module 105 receives an operation for a single printing job or a group printing job.

In step S504, the printing job distribution module 110 determines whether or not the operation is an operation for the group printing job, processes to step S512 in a case where the operation is an operation for the group printing job, and proceeds to step S506 otherwise. For example, it may be determined whether or not an operation target is the group printing job, with reference to a group flag column 610 of a group printing job table 600, a group flag column 710 of a group printing job table 700, and a group flag column 810 of a printing job table 800 to be described later.

In step S506, the single printing job instructing module 115 extracts a printing apparatus corresponding to the printing job. For example, the printing apparatus may be extracted from a printing job correspondence table 1000 to be described later. Properties of the printing apparatus are extracted. For example, the properties may be extracted from a printing apparatus table 900 to be described later.

In step S508, the single printing job instructing module 115 extracts a printing apparatus side printing job ID corresponding to a printing job ID thereof. For example, the printing apparatus side printing job ID may be extracted from the printing job correspondence table 1000 to be described later.

In step S510, the single printing job instructing module 115 gives an instruction of the operation for the printing job having the printing apparatus side printing job ID of the printing apparatus through the image forming apparatus communication module 130.

In step S512, the group printing job instructing module 125 extracts a printing job included in the group printing job. For example, the printing job may be extracted from a printing job ID column 625 of the group printing job table 600 or a printing job ID column 725 (printing job ID columns 725 (in FIG. 7, five printing job ID columns 725 such as a printing job ID column 725A) which corresponding to the number of printing jobs in the-number-of-printing jobs column 720) of the group printing job table 700 to be described later.

In step S514, the group printing job instructing module 125 extracts a printing apparatus corresponding to the printing job. For example, the printing apparatus may be extracted from the printing job correspondence table 1000 to be described later. Properties of the printing apparatus are extracted. For example, the properties may be extracted from the printing apparatus table 900 to be described later.

In step S516, the group printing job instructing module 125 extracts a printing apparatus side printing job ID corresponding to the printing job ID. For example, the printing apparatus side printing job ID may be extracted from the printing job correspondence table 1000 to be described later.

In step S518, the image forming apparatus condition detection module 120 detects the status of the printing job having the printing apparatus side printing job ID of the printing apparatus. For example, a printing apparatus condition table 1100 to be described later is generated from detection results.

In step S520, the group printing job instructing module 125 gives an instruction of an operation for a target printing job having each printing apparatus side printing job ID through the image forming apparatus communication module 130, in accordance with an operation method table 1200.

FIG. 6 is a diagram illustrating an example of a data structure of the group printing job table 600. The group printing job table 600 includes a printing job ID column 605, the group flag column 610, a group printing job name column 615, a number-of-printing jobs column 620, a printing job ID column 625, and a highest priority printing job ID column 630. The printing job ID column 605 stores information (printing job ID) for uniquely identifying a printing job or a group printing job in this exemplary embodiment. The group flag column 610 stores information (group flag) indicating whether being a group printing job. The group printing job name column 615 stores the name of the group printing job. The number-of-printing jobs column 620 stores the number of printing jobs included in the group printing job. The printing job ID column 625 stores a printing job ID included in the group printing job. Information on each printing job is stored in the printing job table 800 to be described later. Plural printing job IDs are stored in the printing job ID column 625. The highest priority printing job ID column 630 stores a printing job ID regarding printing with the highest priority in the group printing job.

The process of step S504 is performed by checking the group flag column 610.

For example, FIG. 6 shows group flag: 1 (a flag indicating being a group printing job), group printing job name: group job A, the number of printing jobs: 5, printing job ID: 1, 10, 15, 16, 20, and highest priority printing job ID: 15, regarding printing job ID: 9.

The group printing job table 700 may be used instead of the group printing job table 600. FIG. 7 is a diagram illustrating an example of a data structure of the group printing job table 700. In the group printing job table 700, the order of priority of each printing job is set. Specifically, the group printing job table 700 includes a printing job ID column 705, a group flag column 710, a group printing job name column 715, a number-of-printing jobs column 720, a printing job ID column 725A, an order column 730A, a printing job ID column 725B, an order column 730B, a printing job ID column 725C, an order column 730C, a printing job ID column 725D, an order column 730D, a printing job ID column 725E, and an order column 730E. The printing job ID column 705 stores a printing job ID. The group flag column 710 stores information (group flag) indicating whether being a group printing job. The group printing job name column 715 stores the name of the group printing job. The number-of-printing jobs column 720 stores the number of printing jobs included in the group printing job. The number-of-printing jobs column 720 is followed by the number of sets of the printing job ID column 725 and the order column 730 which correspond to the number in the number-of-printing jobs column 720. The printing job ID column 725 stores a printing job ID included in the group printing job. Information on each printing job is stored in the printing job table 800 to be described later. The order column 730 stores the order of priority (the order of printing) in the group printing job of the printing job having the printing job ID.

The process of step S504 is performed by checking the group flag column 710.

For example, FIG. 7 shows group flag: 1, group printing job name: group job A, and the number of printing jobs: 5 regarding printing job ID: 9, shows order: 3 regarding printing job ID: 1, shows order: 2 regarding printing job ID: 10, shows order: 1 regarding printing job ID: 15, shows order: 5 regarding printing job ID: 16, and shows order: 4 regarding printing job ID: 20.

FIG. 8 is a diagram illustrating an example of a data structure of the printing job table 800. The printing job table 800 includes a printing job ID column 805, a group flag column 810, a printing job name column 815, an owner column 820, a number-of-pages column 825, a number-ofcopies column 830, a sheet size column 835, a sheet type column 840, a printing document column 845, a color/black-and-white column 850, a designated date and time column 855, and a post-processing column 860. The printing job ID column 805 stores a printing job ID. The group flag column 810 stores information (group flag) indicating whether being a group printing job. The printing job name column 815 stores a printing job name. The owner column 820 stores the owner (the owner of printed matter which is the final processing result, an end user) of the printing job. The number-of-pages column 825 stores the number of pages of a printing document in the printing job. The number-of-copies column 830 stores the number of copies of printing in the printing job. The sheet size column 835 stores the size of a sheet in the printing job. The sheet type column 840 stores the type of sheet. The printing document column 845 stores a printing document in the printing job. The printing document column may store the printing document itself, or may store a location where the printing document is stored (for example, a document ID, a document name, a Uniform Resource Locator (URL), or the like). The color/black-and-white column 850 may store information indicating whether the printing job is color printing or black-and-white printing. In the color/black-and-white column 850, not only color and black-and-white but also a special color (a gold color, a silver color, a fluorescent color, and the like) may be designated. The designated date and time column 855 stores the date and time of designation. The post-processing column 860 stores post-processing (for example, stapler processing, punching processing, binding processing, and the like) in the printing job.

FIG. 9 is a diagram illustrating an example of a data structure of the printing apparatus table 900. The printing apparatus table 900 includes a printing apparatus ID column 905, a printing apparatus name column 910, a printing speed column 915, a mountable toner type column 920, a mountable sheet column 925, a two-sided printing column 930, a maximum sheet feed capacity column 935, a number-of-discharging-destinations column 940, a post-processing function column 945, and a printing cost column 950. The printing apparatus ID column 905 stores information (printing apparatus ID) for uniquely identifying a printing apparatus in this exemplary embodiment. The printing apparatus name column 910 stores the name of the printing apparatus. The printing speed column 915 stores a printing speed of the printing apparatus. Meanwhile, the printing speed column 915 may be provided with a printing speed for each type of sheet (A4 size, A3 size, and the like). The mountable toner type column 920 stores the type of toner mountable in the printing apparatus. For example, the type of toner includes the type of color toner (a black toner, a cyan toner, a magenta toner, a yellow toner, a special color toner, and the like). The mountable sheet column 925 stores a sheet mountable in the printing apparatus. The two-sided printing column 930 stores indicating whether or not the printing apparatus is capable of performing two-sided printing. The maximum sheet feed capacity column 935 stores a maximum sheet feed capacity of the printing apparatus. The number-of-discharging-destinations column 940 stores the number of discharging destinations included in the printing apparatus. Further, the number-of-discharging-destinations column may store a capacity (the number of discharged sheets capable of being received by the discharged sheet reception unit) in the discharging destination. The post-processing function column 945 stores a post-processing function of the printing apparatus. The printing cost column 950 stores printing costs in the printing apparatus.

Meanwhile, in a case where the number of printing apparatuses capable of printing a group printing job is two or more, a printing apparatus having a short printing time (a high printing speed) and low printing costs may be selected.

FIG. 10 is a diagram illustrating an example of a data structure of the printing job correspondence table 1000. A printing job is managed on a printing apparatus side, and identification information (printing apparatus side printing job ID) is uniquely given to the printing job. The printing job correspondence table 1000 is generated by receiving conditions (correspondence between the printing job and the printing apparatus side printing job ID) from the image forming apparatus 150 by the image forming apparatus condition detection module 120. In addition, correspondence between a printing apparatus ID column 1005 and a printing job ID column 1010 in the printing job correspondence table 1000 is generated in a case where the printing job is transferred to the printing apparatus.

The printing job correspondence table 1000 includes a printing apparatus ID column 1005, a printing job ID column 1010, and a printing apparatus side printing job ID column 1015. The printing apparatus ID column 1005 stores a printing apparatus ID. The printing job ID column 1010 stores a printing job ID to be processed by a printing apparatus having the printing apparatus ID. The printing apparatus side printing job ID column 1015 stores a printing apparatus side printing job ID in the printing apparatus that processes the printing job having the printing job ID. That is, the printing apparatus side printing job ID column stores correspondence between the printing apparatus, the printing job, and the printing apparatus side printing job ID.

FIG. 11 is a diagram illustrating an example of a data structure of the printing apparatus condition table 1100. The printing apparatus condition table 1100 is generated by detecting conditions of each printing apparatus by the image forming apparatus condition detection module 120. The printing apparatus condition table 1100 includes a printing apparatus ID column 1105, a printing apparatus name column 1110, a printing apparatus side printing job ID column 1115, a condition column 1120, a predicted printable date and time column 1125, a remaining toner quantity column 1130, and a remaining sheet quantity column 1140, the remaining toner quantity column 1130 includes an A toner column 1132, a B toner column 1134, and a C toner column 1136, and the remaining sheet quantity column 1140 includes an A4 column 1142 and an A3 column 1144. The printing apparatus ID column 1105 stores a printing apparatus ID. The printing apparatus name column 1110 stores the name of the printing apparatus. The printing apparatus side printing job ID column 1115 stores a printing apparatus side printing job ID. The condition column 1120 stores conditions of the printing apparatus. The predicted printable date and time column 1125 stores a predicted date and time in a case where the printing apparatus is capable of performing printing. The remaining toner quantity column 1130 stores the present remaining quantity of toner in the printing apparatus. The A toner column 1132 stores a remaining quantity of A toner. The B toner column 1134 stores a remaining quantity of B toner. The C toner column 1136 stores a remaining quantity of C toner. The remaining toner quantity column 1130 may be provided not only with remaining quantities of black toner, cyan toner, magenta toner, and yellow toner but also with a remaining quantity of special color toner with which the printing apparatus is capable of coping. The remaining sheet quantity column 1140 stores the present remaining quantity of sheets in the printing apparatus. The A4 column 1142 stores a remaining quantity of A4 sheets. The A3 column 1144 stores a remaining quantity of A3 sheets.

FIG. 12 is a diagram illustrating an example of a data structure of the operation method table 1200.

The operation method table 1200 includes a printing job operation column 1205, an order-of-execution-in-printing job group column 1210, and a target status column 1215. The printing job operation column 1205 stores an operation for a printing job. The order-of-execution-in-printing job group column 1210 stores the order of execution in a printing job group in a printing apparatus which is a transmission destination of the printing job. The target status column 1215 stores a status to be a target for the printing job. That is, the printing job in this status becomes a target for an operation.

Regarding a first line of the operation method table 1200, in a case where "restart of printing" is received as an operation for a printing job, an instruction of "restart of printing" is given for a printing job of the printing apparatus so that a "forward order" which is the same as the order of execution in the printing job group is set for the printing job for which the status in the printing apparatus is set to be in a "printing holding mode". That is, the printing is caused to be restarted for the printing job set to be in a printing holding mode, in the same order as the order in the group printing job.

Regarding a second line, in a case where "pause" is received as an operation for a printing job, an instruction of "pause" is given for a printing job of the printing apparatus so that a "reverse order" to the order of execution in the printing job group is set for the printing job for which the status in the printing apparatus is set to be in a "printing mode". That is, an instruction of pause is given for the printing job set to be in a printing mode in reverse order to the order in the group printing job. After the second printing job and the subsequent printing jobs are made to pause, the first printing job (a printing job which is currently in a printing mode) is made to pause.

Regarding a third line, in a case where "cancellation" is received as an operation for a printing job, an instruction of "cancellation" is given for a printing job of the printing apparatus so that a "reverse order" to the order of execution in the printing job group is set for the printing job for which the status in the printing apparatus is set to be in a "printing holding mode, printing mode". That is, the printing job set to be in a printing holding mode or a printing mode is made to be canceled in reverse order to the order in the group printing job.

Regarding a fourth line, in a case where "trial printing" is received as an operation for a printing job, an instruction of "trial printing" is given for a printing job of the printing apparatus so that a "forward order" which is the same as the order of execution in the printing job group is set for the printing job for which the status in the printing apparatus is set to be in a "printing holding mode". That is, trial printing is performed on the printing job set to be in a printing holding mode in the same order as the order in the group printing job.

Regarding a fifth line, in a case where "preferential printing" is received as an operation for a printing job, an instruction of "preferential printing" is given for a printing job of the printing apparatus so that a "forward order" which is the same as the order of execution in the printing job group is set for the printing job for which the status in the printing apparatus is set to be in a "printing holding mode". That is, preferential printing is performed on the printing job set to be in a printing holding mode in the same order as the order in the group printing job. Meanwhile, the preferential printing is equipped by a queue, and thus is set to be in a "forward order".

Regarding a sixth line, in a case where "interruption printing" is received as an operation for a printing job, an instruction of "interruption printing" is given for a printing job of the printing apparatus so that a "reverse order" to the order of execution in the printing job group is set for the printing job for which the status in the printing apparatus is set to be in a "printing holding mode". That is, interruption printing is performed on the printing job set to be in a printing holding mode in reverse order to the order in the group printing job. Meanwhile, the interruption printing is equipped by a stack, and thus is set to be in a "reverse order".

Figure 13:
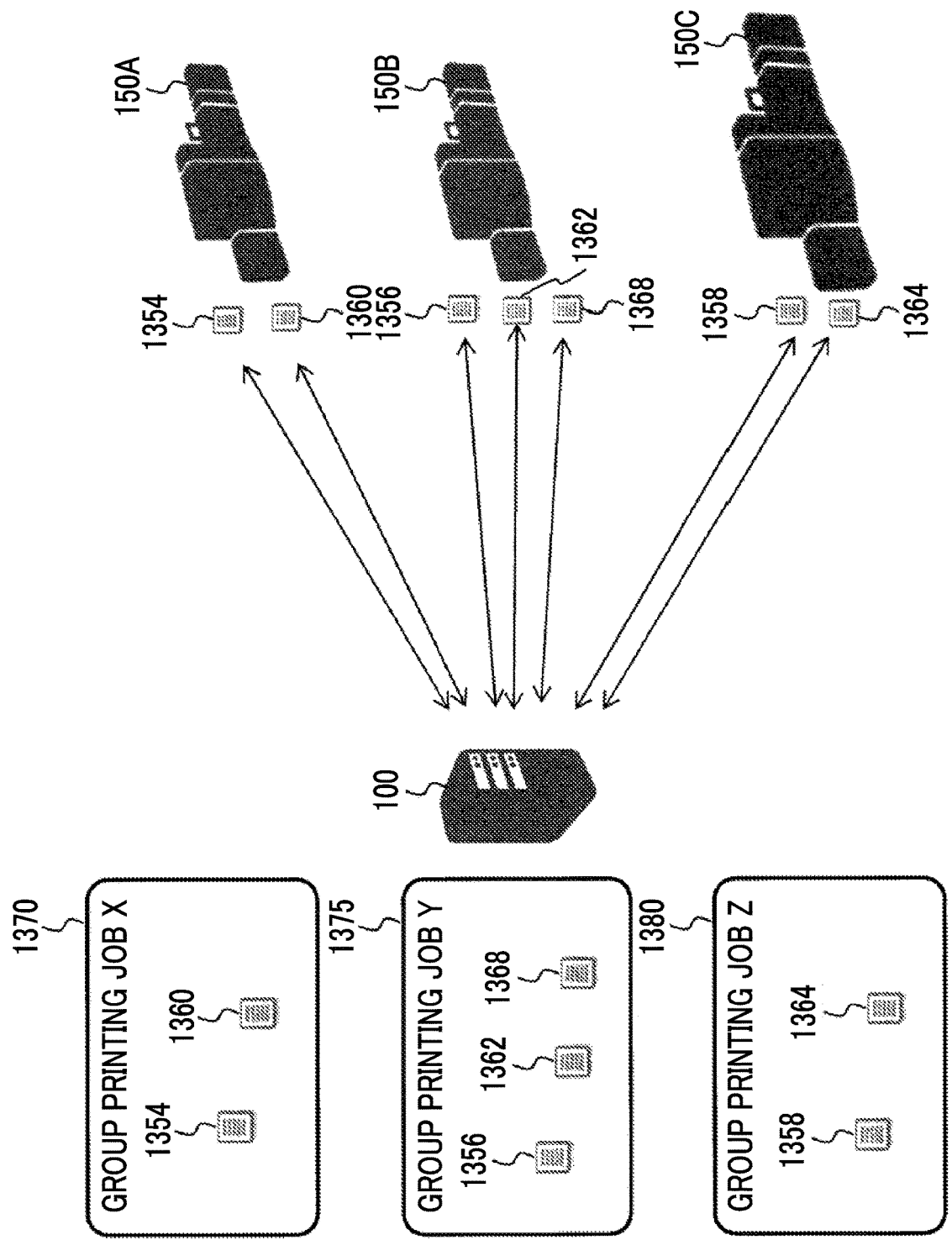
FIG. 13 is a diagram illustrating a processing example according to this exemplary embodiment.

FIG. 13 is a diagram illustrating a processing example according to this exemplary embodiment.

The information processing apparatus 100 receives a group printing job X 1370, a group printing job Y 1375, and a group printing job Z 1380. The group printing job X 1370 includes a printing job 1354 and a printing job 1360. The group printing job Y 1375 includes a printing job 1356, a printing job 1362, and a printing job 1368. The group printing job Z 1380 includes a printing job 1358 and a printing job 1364. The information processing apparatus 100 transmits a printing job included in the group printing job X 1370 to the image forming apparatus 150A, and performs processing in accordance with the printing job 1354 and the printing job 1360. The information processing apparatus 100 transmits a printing job included in the group printing job Y 1375 to the image forming apparatus 150B, and performs printing in accordance with the printing job 1356, the printing job 1362, and the printing job 1368. The information processing apparatus 100 transmits a printing job included in the group printing job Z 1380 to the image forming apparatus 150C, and performs printing in accordance with the printing job 1358 and the printing job 1364.

A printing job of the information processing apparatus 100 having a function of a printing job management system and a printing job in each image forming apparatus 150 are associated (linked) with each other in the printing job correspondence table 1000, and the information processing apparatus 100 may ascertain the status of the printing job in each image forming apparatus 150 (see the printing apparatus condition table 1100 illustrated in the example of FIG. 11).

In the information processing apparatus 100, an operation for a printing job in the image forming apparatus 150 may be performed for a group printing job and a printing job included in the group printing job.

In a case where an operation for the group printing job is received, an instruction is given for a printing job in the image forming apparatus 150 on the basis of the printing job correspondence table 1000, with respect to the image forming apparatus 150 having a printing job associated with a printing job in a status in which the operation is capable of being performed, in the order (a forward order or a reverse order with respect to the order of printing jobs included in the group printing job) which is defined in accordance with the operation.

Figure 14:
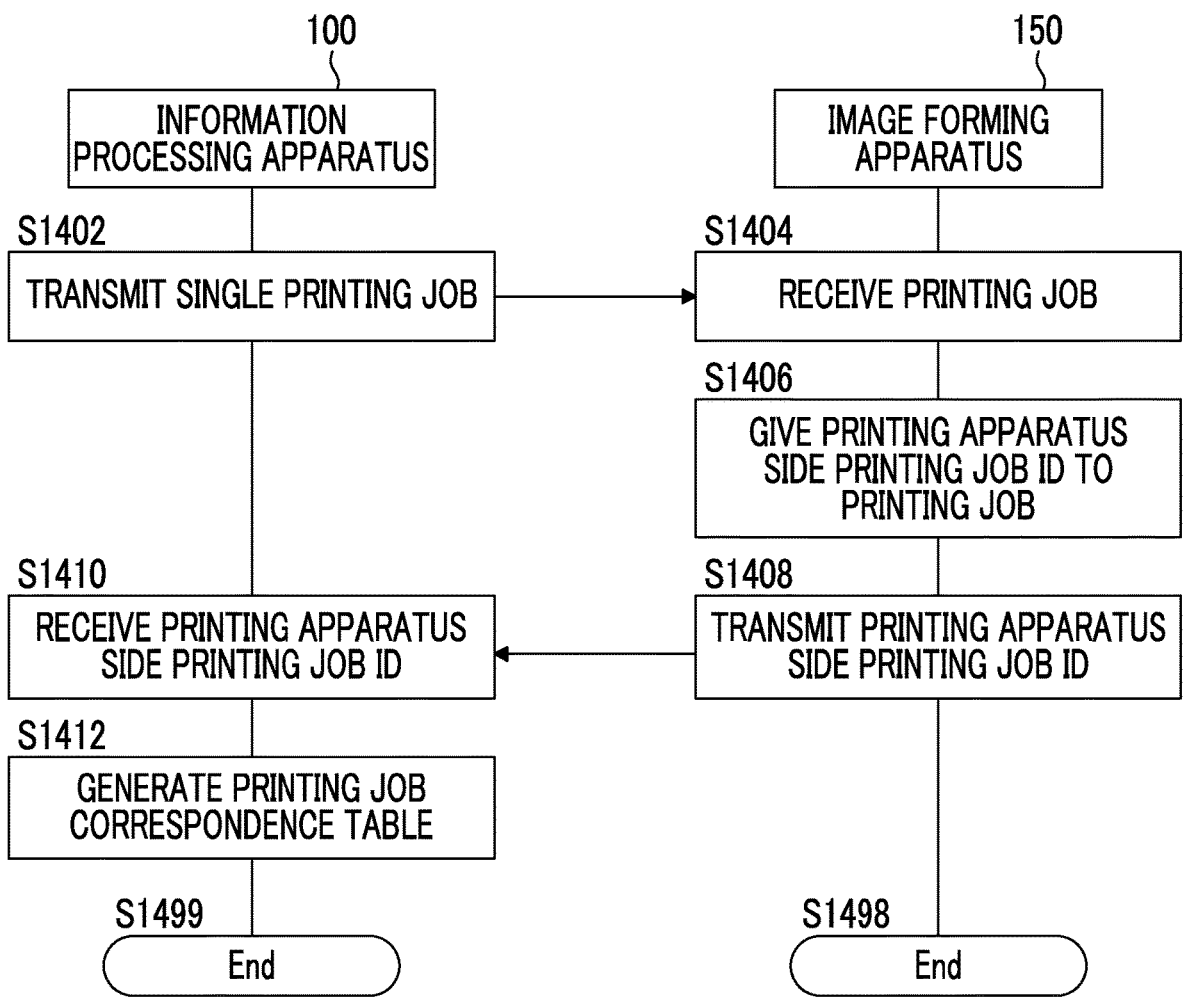
FIG. 14 is a flowchart illustrating a processing example according to this exemplary embodiment.

FIG. 14 is a flowchart illustrating a processing example according to this exemplary embodiment, and illustrates a processing example in which the printing job correspondence table 1000 is generated.

In step S1402, the information processing apparatus 100 transmits a single printing job to the image forming apparatus 150.

In step S1404, the image forming apparatus 150 receives the printing job from the information processing apparatus 100.

In step S1406, the image forming apparatus 150 gives a printing apparatus side printing job ID to the printing job.

In step S1408, the image forming apparatus 150 transmits the printing apparatus side printing job ID to the information processing apparatus 100.

In step S1410, the information processing apparatus 100 receives the printing apparatus side printing job ID from the image forming apparatus 150.

In step S1412, the information processing apparatus 100 generates the printing job correspondence table 1000.

Figure 15:
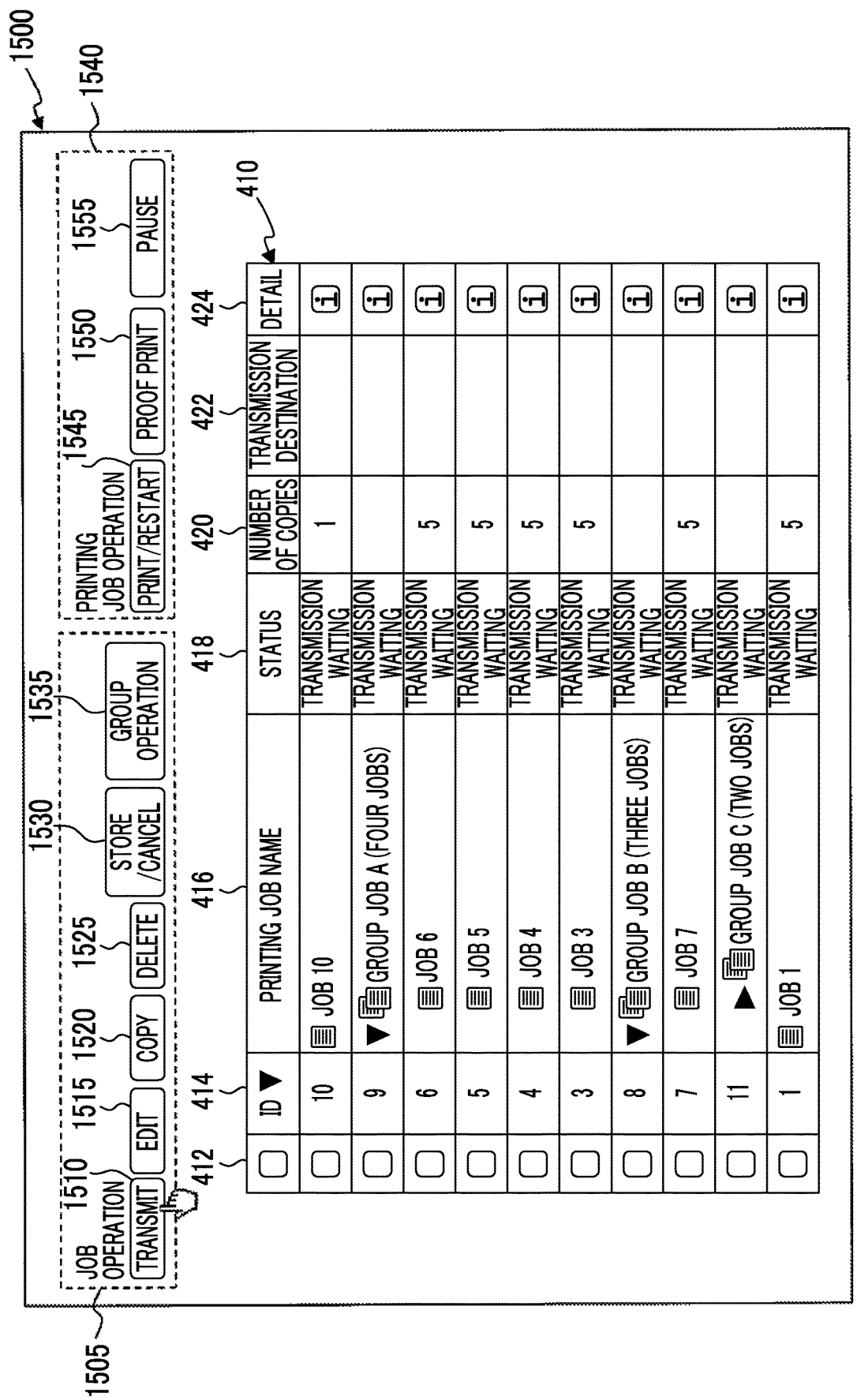
FIG. 15 is a diagram illustrating a display example of a screen according to this exemplary embodiment.

FIG. 15 is a diagram illustrating a display example of a screen according to this exemplary embodiment.

An information processing apparatus side printing job operation region 1505, a printing apparatus side printing job operation region 1540, and the printing job display region 410 are displayed on a screen 1500.

A transmission button 1510, an editing button 1515, a copy button 1520, a deletion button 1525, a holding/cancellation button 1530, and a group operation button 1535 are displayed in the information processing apparatus side printing job operation region 1505.

A printing/restart button 1545, a proof printing button 1550 indicating trial printing, and a pause button 1555 are displayed in the printing apparatus side printing job operation region 1540.

A printing job or a group printing job is selected in the check column 412 in the printing job display region 410 by the user's operation. Therefore, in a case where a button in the printing apparatus side printing job operation region 1540 is selected, processing corresponding to the button is performed on the printing job or the group printing job which is selected in the check column 412. Meanwhile, the printing/restart button 1545, the proof printing button 1550, and the pause button 1555 are illustrated in the printing apparatus side printing job operation region 1540, but buttons corresponding to cancellation, preferential printing, interruption printing, and the like may be displayed.

A hardware configuration example of the information processing apparatus 100 according to this exemplary embodiment will be described with reference to FIG. 16. A configuration illustrated in FIG. 16 is configured by, for example, a personal computer (PC) or the like, and the hardware configuration example including a data reading unit 1617 such as a scanner and a data output unit 1618 such as a printer is illustrated.

A Central Processing Unit (CPU) 1601 is a control unit that executes processing based on a computer program in which the sequence of execution of various modules described in the above-described exemplary embodiment, that is, the operation reception module 105, the printing job distribution module 110, the single printing job instructing module 115, the image forming apparatus condition detection module 120, and the image forming apparatus communication module 130.

A Read Only Memory (ROM) 1602 stores programs, computational parameters, and the like which are used by the CPU 1601. A Random Access Memory (RAM) 1603 stores programs used in the execution of the CPU 1601, parameters that appropriately change in the execution, and the like. The Rom and the RAM are connected to each other by a host bus 1604 constituted by a CPU bus or the like.

The host bus 1604 is connected to an external bus 1606 such as a Peripheral Component Interconnect/Interface (PCI) bus through a bridge 1605.

A keyboard 1608 and a pointing device 1609 such as a mouse are devices operated by an operator. A display 1610 is a liquid crystal device, a Cathode Ray Tube (CRT), or the like, and displays various pieces of information as texts or image information. In addition, a touch screen or the like which has both functions as the pointing device 1609 and the display 1610 may be used. In this case, regarding the realization of the function of the keyboard, the function of the keyboard may be realized by drawing a keyboard (also referred to as a so-called software keyboard, a screen keyboard, or the like) on a screen (touch screen) using software without physical connection like the keyboard 1608.

A Hard Disk Drive (HDD) 1611 has a hard disk (may be a flash memory or the like) embedded therein, drives the hard disk, and records or reproduces programs executed by the CPU 1601 and information. The hard disk stores the group printing job table 600, the group printing job table 700, the printing job table 800, the printing apparatus table 900, the printing job correspondence table 1000, the printing apparatus condition table 1100, the operation method table 1200, and the like. Further, the hard disk stores various other data, various computer programs, and the like.

The drive 1612 reads out data or programs recorded in a removable storage medium 1613, such as a magnetic disk, an optical disk, a magneto-optical disk, or a semiconductor memory, which is mounted therein, and supplies the data or the programs to the RAM 1603 connected thereto to the RAM 1603 connected thereto through an interface 1607, the external bus 1606, the bridge 1605, and the host bus 1604. Meanwhile, the removable storage medium 1613 may also be used as data storage region.

The connection port 1614 is a port for connection to an external connection device 1615, and includes a connection unit such as a USB or IEEE1394. The connection port 1614 is connected to the CPU 1601 and the like through the interface 1607, the external bus 1606, the bridge 1605, the host bus 1604, and the like. A communication unit 1616 is connected to a communication line, and executes data communication processing with the outside. The data reading unit 1617 is, for example, a scanner, and executes a process of reading a document. A data output unit 1618 is, for example, a printer, and executes a process of outputting document data.

Meanwhile, a hardware configuration of the information processing apparatus 100 illustrated in FIG. 16 shows one configuration example. This exemplary embodiment is not limited to the configuration illustrated in FIG. 16, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 16 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor, configured to:
        receive an operation for a group printing job including a plurality of printing jobs; and
        give an instruction to an image forming apparatus which is performing printing processing based on the group printing job, in accordance with the operation,
        wherein in a case where the operation for the group printing job is received, the processor gives the instruction to the image forming apparatus to execute the operation for the plurality of printing jobs of the group printing job in an order of execution according to a mode to which the image forming apparatus is set,
    wherein the order of execution is either a forward order or a reverse order with respect to the order of the plurality of printing jobs included in the group printing job,
    wherein in a case where the mode is set to a first mode, the order of execution is the forward order, and
    wherein in a case where the mode is set to a second mode different from the first mode, the order of execution is the reverse order.

2. The information processing apparatus according to claim 1,
    wherein in a case where restart of printing is received as the operation for the group printing job, the processor gives an instruction for restarting printing to the image forming apparatus corresponding to the printing job, which is set to be in a printing holding mode, in the group printing job.

3. The information processing apparatus according to claim 2,
    wherein the processor gives an instruction for restarting printing to the image forming apparatus in order in the group printing job, among the printing jobs which are set to be in a printing holding mode.

4. The information processing apparatus according to claim 1,
    wherein in a case where pause is received as the operation for the group printing job, the processor gives an instruction for pause to the image forming apparatus corresponding to the printing job which is set to be in a printing mode in the group printing job.

5. The information processing apparatus according to claim 4,
    wherein the processor gives an instruction for pause to the image forming apparatus in reverse order to the order in the group printing job, among the printing jobs which are set to be in a printing mode.

6. The information processing apparatus according to claim 1,
    wherein in a case where cancellation is received as the operation for the group printing job, the processor gives an instruction for cancellation to the image foil ling apparatus corresponding to the printing job which is set to be in a printing holding mode or a printing mode in the group printing job.

7. The information processing apparatus according to claim 6,
    wherein the processor gives an instruction for cancellation to the image forming apparatus in reverse order to the order in the group printing job, among the printing jobs which are set to be in a printing holding mode or a printing mode.

8. The information processing apparatus according to claim 1,
    wherein in a case where trial printing is received as the operation for the group printing job, the processor gives an instruction for trial printing to the image forming apparatus corresponding to the printing job which is set to be in a printing holding mode in the group printing job.

9. The information processing apparatus according to claim 8,
wherein the processor gives an instruction for trial printing to the image forming apparatus in order in the group printing job, among the printing jobs which are set to be in a printing holding mode.

10. The information processing apparatus according to claim 1,
wherein in a case where preferential printing is received as the operation for the group printing job, the processor gives an instruction for preferential printing to the image forming apparatus corresponding to the printing job which is set to be in a printing holding mode in the group printing job.

11. The information processing apparatus according to claim 10,
wherein the processor gives an instruction for preferential printing to the image forming apparatus in order in the group printing job, among the printing jobs which are set to be in a printing holding mode.

12. The information processing apparatus according to claim 1,
wherein in a case where interruption printing is received as the operation for the group printing job, the processor gives an instruction for interruption printing to the image forming apparatus corresponding to the printing job which is set to be in a printing holding mode in the group printing job.

13. The information processing apparatus according to claim 12,
wherein the processor gives an instruction for interruption printing to the image forming apparatus in reverse order to order in the group printing job, among the printing jobs which are set to be in a printing holding mode.

14. A non-transitory computer readable medium storing an information processing program causing a processor of a computer to:
receive an operation for a group printing job including a plurality of printing jobs; and
give an instruction to an image forming apparatus performing printing processing based on the printing job, in accordance with the operation,
wherein in a case where the operation for the group printing job is received, the processor gives the instruction to the image forming apparatus to execute the operation for the plurality of printing jobs of the group printing job in an order of execution according to a mode to which the image forming apparatus is set,
wherein the order of execution is either a forward order or a reverse order with respect to the order of the plurality of printing jobs included in the group printing job,
wherein in a case where the mode is set to a first mode, the order of execution is the forward order, and
wherein in a case where the mode is set to a second mode different from the first mode, the order of execution is the reverse order.

15. An information processing method, comprising:
receiving an operation for a group printing job including a plurality of printing jobs; and
giving an instruction to an image forming apparatus which is performing printing processing based on the group printing job, in accordance with the operation,
wherein in a case where the operation for the group printing job is received, the instruction is given to the image forming apparatus to execute the operation for the plurality of printing jobs of the group printing job in an order of execution according to a mode to which the image forming apparatus is set,
wherein the order of execution is either a forward order or a reverse order with respect to the order of the plurality of printing jobs included in the group printing job,
wherein in a case where the mode is set to a first mode, the order of execution is the forward order, and
wherein in a case where the mode is set to a second mode different from the first mode, the order of execution is the reverse order.

* * * * *